Aug. 30, 1949.  J. MERCIER  2,480,496
TUBE COUPLING
Filed March 6, 1944  2 Sheets-Sheet 1
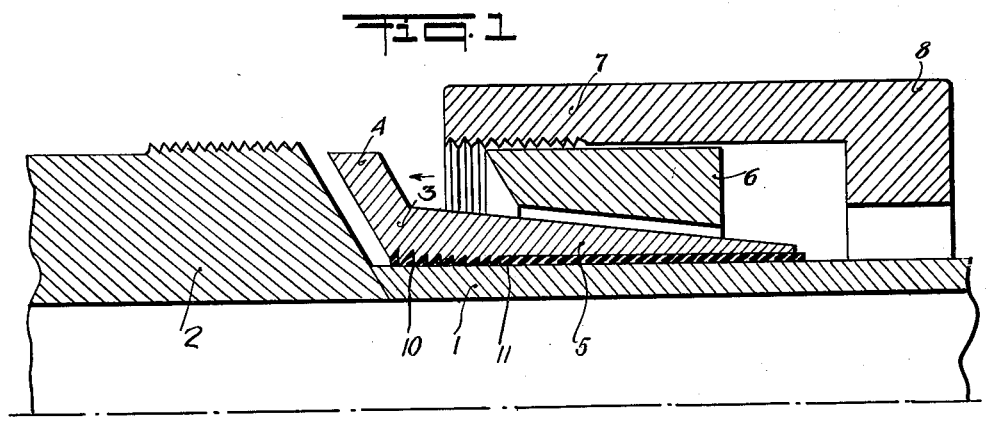
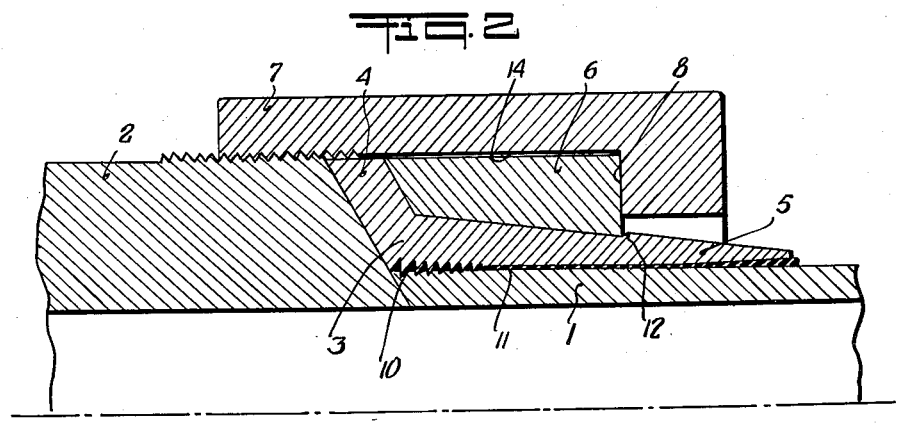
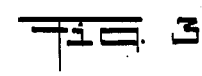
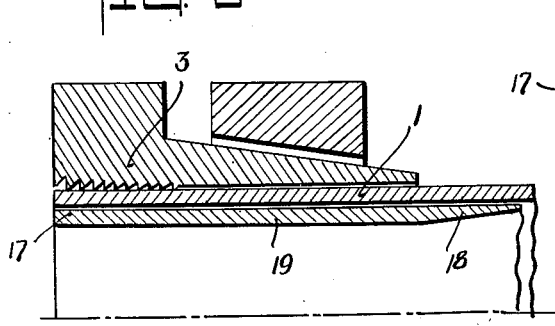
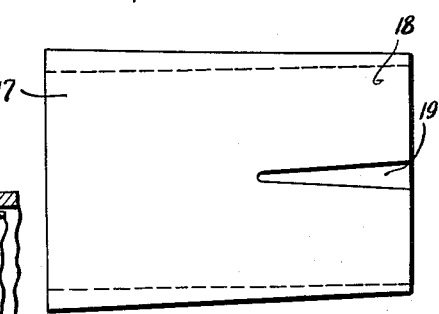
INVENTOR.
Jean Mercier
BY
Howard J. Jeandron
ATTORNEY INVENTOR.
Jean Mercier
BY
Howard J. Jeandron
ATTORNEY Patented Aug. 30, 1949

2,480,496

UNITED STATES PATENT OFFICE 2,480,496

TUBE COUPLING

Jean Mercier, New York, N. Y.

Application March 6, 1944, Serial No. 525,247

10 Claims. (Cl. 285—122)

This application is a continuation in part of my abandoned application, Serial No. 503,626, filed September 24, 1943.

The present invention pertains to a coupling or fitting and more particularly to a coupling for high pressure hydraulic lines.

The usual couplings generally include members adapted to engage the tube ends or end to be coupled. When a coupling is mounted on a tube or line, the coupling member grips the tube end firmly, either by compressing the said member so as to reduce its diameter or by giving the same a conical cross section and wedging it on the tube end. The coupling member is then threadably secured in conventional manner, as, for instance, by attaching to the device to which the tube is to be coupled.

In this method, the coupling member is disengaged from the tube end, whenever the same is to be uncoupled, and said coupling member is caused to re-engage said tube end when a re-coupling is desired. Every time that the coupling member grips or disengages the tube end, the latter will be subject to certain deformations. Although various improvements have been suggested in order to reduce these deformations to a minimum, it has not been possible to reduce the wear to which the tube ends are subjected. Accordingly, the ends of tubes which are frequently coupled and uncoupled will wear out after a relatively small number of coupling and uncoupling operations. The wear of the tube end will depend upon the extent of the deformation which takes place when a coupling is completed, and the extent of said wear is determined by the pressure of the fluid in the tube. Frequently, the tube or the fitting or both have to be replaced, because of wear or failure.

It is an object of the present invention to devise an improved coupling for a tube which minimizes any wear on the coupled tube, regardless of the number of coupling and uncoupling operations.

A further object is to provide a coupling which does not require intricate initial flaring or shaping of the coupled tubing. In the present invention, two annular auxiliary members; to wit, a coupling washer and a coupling ring, are provided at each tube end which is to be coupled, and at least one of these members has a longitudinal portion which has a wall of conical or frustoconical shape.

When the coupling unit is first installed on a tube, the coupling washer, according to the present invention, engages the outer wall of the coupled tube end and the coupling ring is then applied against the coupling washer so as to deform said washer; and to lock said tube end and coupling washer and coupling ring to each other. The coupling ring may be threadably secured in conventional manner to any outlet or fitting to which the tube is to be coupled.

Each time the tube is coupled and uncoupled from the outlet or fitting the conventional means are turnably secured or released, while the tube end, the coupling washer and the coupling ring remain permanently fixed to each other in the same relationship they assumed after the first coupling operation.

Due to this pre-arranged relationship, the tube end is relieved from any further deformation, after the first coupling operation has been completed, and no further wear of the tubing will be caused, regardless of the number of subsequent uncoupling and coupling operations.

Further features of the present invention will become apparent from the following description of illustrative embodiments thereof, which are disclosed in the annexed description and drawings.

Fig. 1 is a longitudinal cross sectional view of one-half of a tube coupling according to the present invention, showing the elements ready to be assembled;

Fig. 2 shows one-half of the coupling of Fig. 1 in longitudinal cross section, after assembly;

Fig. 3 shows another embodiment of the coupling in longitudinal cross section; and Fig. 4 shows an insert for the coupling made according to Fig. 3;

Figure 5:
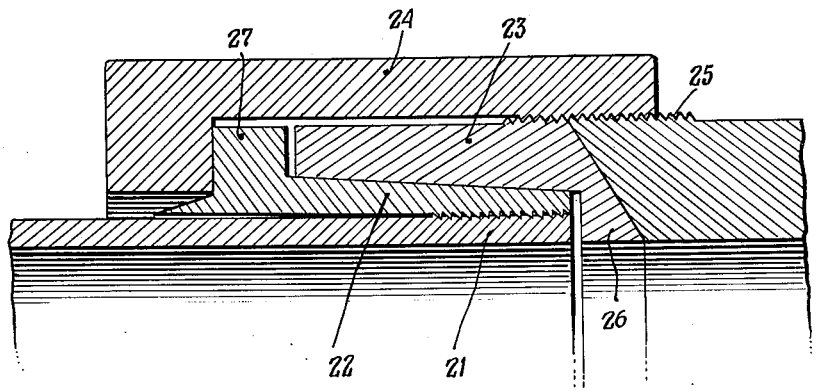
Fig. 5 is a longitudinal cross sectional view of one-half of a tube coupling similar to that of Fig. 1, but modified in details.

In Figs. 1 and 2, the end of tube 1 is to be coupled to a fitting or outlet 2. A coupling washer 3, which comprises a transverse neck 4 and a longitudinal tapered portion 5, is placed over the end of the tube 1, so that the inner wall of neck 4 abuts the proximate transverse wall of outlet 2. The washer 3 also has a portion of its inner longitudinal face, adjacent the end of tube 1, provided with teeth or serrations 10.

The coupling ring 6 has an inner longitudinal wall whose diameter is at all points slightly less than the corresponding diameter of the outer longitudinal flared wall of washer 3.

I provide a nut 7, adapted to be threadably secured to the threaded section of the fitting or outlet 2. Said nut 7 has a shoulder 8 to engage the proximate end-wall of ring 6, and a retaining section 14 for the ring 6.

When nut 7 is threaded upon outlet 2, the ring 6 is forced up the taper of portion 5 of washer 3 and compresses the same. This causes the serrations 10 formed in portion 5 of washer 3 to bite into the tube end 1 whereby the washer 3 will grip the tube 1 firmly.

When ring 6 is pressed home completely by shoulder 8, due to the compression of portion 5, a bulge 12 will be formed in that area of portion 5 which is adjacent but not engaged by ring 6. This bulge will retain ring 6 in place when the nut 7 is released.

Tube end 1 with washer 3 and ring 6 permanently secured thereto can be coupled and uncoupled by applying or removing nut 7 without appreciable wear.

A suitable seal may be provided between shoulder 4 and outlet 2, with the coupling members as above stated.

In the application of the washer 3 to the tube 1, it is apparent that washer 3 must be made of a material harder than tube end 1 and ring 6 must be resistant enough to deform washer 3 when the coupling is being assembled. Washer 3, and particularly portion 5, must be partially slotted or comprised of a material thin enough to permit of the necessary deformation when ring 6 is applied.

Annular elements of a deformable material, such as a rubber compound, may be inserted into the grooves between serrations 10 filling them partially before the tube coupling is assembled. This will assist in insuring satisfactory seal when the coupling is in operation. It is also advantageous to line the inner surface of portion 5 with a sleeve 11 of a similar material over the portion extending between serrations 10 and the opposite end thereof. This will leave tube end 1 free to have a limited elastic movement and damped vibrations. Wherever such annular elements and/or a lining are used, they are applied best by vulcanizing the same on the metallic surface of portion 5.

The serrations 10 are preferably numerous and of small dimensions when the wall of the tube to be coupled is thin. As the thickness of the tubewall is increased, the number of serrations may decrease and their size may increase. With very thick tubing and where high fluid pressure is to prevail in the tube, it may be advantageous to provide grooves in the outer wall of the tube which are adapted to receive the serrations of the coupling washer. It is most advantageous to give the serrations 10 decreasing dimensions, beginning with the largest tooth immediately adjacent the end of the tube, and ending with the smallest tooth at the opposite end of the serrations.

Figs. 3 and 4 show a sleeve 17 inserted into tube-end 1, for the purpose of reinforcing the same. Sleeve 17 preferably projects into the interior of tube end 1 beyond the portion thereof which is engaged by coupling washer 3 when the coupling is assembled.

The projecting portion 18 of sleeve 17 may include a break 19 in its periphery which increases in width from the area adjacent the coupling washer toward the inner end of portion 18.

When the coupling is assembled and the tube is functioning under high pressure, the tube end which is engaged by the coupling members is practically rigid while the free portions of the tube will expand and contract to a certain extent in accordance with the variations of pressure which may occur. In this case, a portion of the tube adjacent the coupling members but not engaged by the same is subjected to particularly heavy stresses. If the tube is subjected to mechanical vibrations the same portion is subjected to similar stresses. The structure according to Figs. 3 and 4, prevents possible injury from such stresses by creating a zone of transition, in which the tube is supported by an annular member whose elasticity decreases gradually from the free portion of the tube toward the rigid tube end, thus dissipating the stresses caused by the vibrating or whipping action.

In Fig. 5 the tube end 21, the coupling washer 22, the coupling ring 23, the nut 24, and the fitting 25 are in a similar relationship to each other and to be assembled in similar manner as members 1—3, 6 and 7 in Figs. 1 and 2.

However with the structure shown in Fig. 5 coupling ring 23 is interposed between nut 24, fitting 25 and washer 22 and may have a shoulder 26 interposed between fitting 25 and tube end 21, so as to enlarge the contact area between the two parts of the coupling members.

On the other hand, washer 22 has a shoulder 27 interposed between ring 23 and nut 24.

This structure insures an even tighter grip than that of Figs. 1 and 2, because the forces acting on the serrated portion of washer 22 in the radial direction, when the coupling according to Fig. 5 is assembled, include no outwardly directed component while in the case of Fig. 1, neck 4 is subjected to forces which do have an outwardly directed component.

While in the coupling according to Fig. 5 as in that according to Figs. 1 and 2, the coupling washer must be harder than the tube end, for reasons obvious to the man skilled in the art, there is, with the structure of Fig. 5, a larger choice of materials which may be selected for making the washer, the coupling ring, the nut and the fitting.

Also, while washer 22 is shown without a rubber lining, such a lining similar to lining 11 in Figs. 1 and 2 may, of course, be added.

The foregoing description is not intended to limit the present invention which extends to all changes, modifications and equivalents within the scope of the appended claims.

What is claimed is:

1. A coupling for tubes which comprises a coupling washer, a coupling ring and a nut, gripping means on the internal face of said washer, a sleeve of rubber-like material, vulcanized to the internal face of said washer, said gripping means having their greatest gripping force at the end of the tube to be gripped and having a progressively reduced gripping force inward on the said tube, means to press said washer and said sleeve into a tight gripping union with the end of a tube, and means to draw said washer into a tight leakproof connection with the flared face of a fitting.

2. A coupling for tubes which comprises a coupling washer, a coupling ring and a nut, gripping means and a sleeve of rubbery material to assist in gripping a tube inserted in said coupling, means to press said gripping means and said sleeve into a tight gripping relation with the tube, and means to draw said washer face into a tight leakproof connection with the flared face of a fitting.

3. A coupling for tubes which comprises three members; to wit, a coupling washer, a coupling ring and a nut, said washer being composed of an annular neck and a projecting sleeve extending along the exterior of an inserted tube, said ring being applied against said projecting sleeve and being adapted, when said coupling is being assembled progressively to cause said washer claspingly to engage said tube and, upon being further applied until one end thereof makes contact with said neck, to secure said three members in proper relationship to each other, means for alternatingly securing and releasing said three members to and from the device to and from which said tube end is to be coupled and uncoupled without affecting the position of said three members with respect to each other, a sleeve inserted into said tube and extending axially from the end thereof to a point beyond said projecting portion of said washer, the portion of said sleeve lying beyond said projecting washer having a break in its periphery, and said break permitting said sleeve to be contracted slightly.

4. A coupling for tubes comprising a washer having a tapered neck portion and an elongated tapered body portion at right angles to said neck portion, a coupling ring having tapered portions corresponding to the tapered portions of said washer, and means adapted to bear against said ring and press said washer body portion into bonded union with a tube and the neck portion of said washer into a tight leakproof connection with the tapered face of a fitting.

5. A coupling as set forth in claim 4 in which gripping means are provided on the internal face of the washer body portion, said gripping means having their greatest gripping force at the end of the tube to be gripped and having a progressively reduced gripping force inward on said tube.

6. In combination, a member which has a bore, a tube which has a tube-end which is in communication with said bore, a washer which has a bore, said tube-end extending through the bore of said washer, said washer having a transverse end-portion which has a transverse inner wall and a transverse outer wall, said transverse inner wall abutting said member under longitudinal pressure, said washer having a longitudinal shank which extends longitudinally away from said transverse end-portion and said member, said shank overlying said tube-end and being transversely compressible and being under transverse gripping pressure to grip said tube-end, said shank having an outer longitudinal wall of tapered shape, the thickest part of said shank being at said transverse end-portion, a coupling ring which is seated on said outer longitudinal wall, said coupling ring having an inner longitudinal wall of tapered shape which abuts said outer longitudinal wall, said coupling ring being thus seated on said outer longitudinal wall under longitudinal and transverse pressure and maintaining said shank under said transverse gripping pressure, said coupling ring having an end-wall which abuts said transverse outer wall of said transverse end-portion under longitudinal pressure, a coupling nut, one end of said coupling nut being connected to said member by cooperating threads, the other end of said coupling nut having a collar which abuts the proximate end-wall of said coupling ring.

7. A combination according to claim 6, in which said coupling ring is locked to said washer independently of said coupling nut, said washer remaining in the aforesaid position and maintaining said shank under said transverse pressure when said coupling nut is removed from said member and from contact with said coupling ring.

8. A combination according to claim 6, in which said coupling ring is locked to said washer independently of said coupling nut, said washer remaining in the aforesaid position and maintaining said shank under said transverse pressure when said coupling nut is removed from said member and from contact with said coupling ring, said coupling ring being thus locked to said washer by an external shoulder of said outer longitudinal wall.

9. A combination according to claim 6, in which said coupling ring is locked to said washer independently of said coupling nut, said washer remaining in the aforesaid position and maintaining said shank under said transverse pressure when said coupling nut is removed from said member and from contact with said coupling ring, the inner longitudinal wall of said washer having at least one gripping tooth which is transversely alined with said coupling ring, said gripping tooth being spaced longitudinally from said transverse end-portion.

10. A combination according to claim 6, in which said coupling ring is locked to said washer independently of said coupling nut, said washer remaining in the aforesaid position and maintaining said shank under said transverse pressure when said coupling nut is removed from said member and from contact with said coupling ring, said shank having a portion which extends longitudinally beyond said washer, said portion having a smooth inner wall, the inner wall of said washer having at least one gripping tooth which is transversely alined with said coupling ring, said gripping tooth being spaced longitudinally from said transverse end-portion.

JEAN MERCIER.

REFERENCES CITED

The following references are of record in the file of this patent:

UNITED STATES PATENTS

| Number | Name | Date |
| --- | --- | --- |
| 1,796,806 | Pearson | Mar. 17, 1931 |
| 2,232,513 | Confer | Feb. 18, 1941 |
| 2,343,922 | Parker | Mar. 14, 1944 |
| 2,349,180 | Lamont | May 16, 1944 |

FOREIGN PATENTS

| Number | Country | Date |
| --- | --- | --- |
| 485,154 | Great Britain | May 16, 1938 |
| 519,641 | Great Britain | Apr. 2, 1940 |
| 587,084 | France | Apr. 10, 1925 |